RE 25,248
June 2, 1959     C. KLAREN ET AL     2,888,952
SELECTOR VALVE
Filed June 7, 1954     3 Sheets-Sheet 1
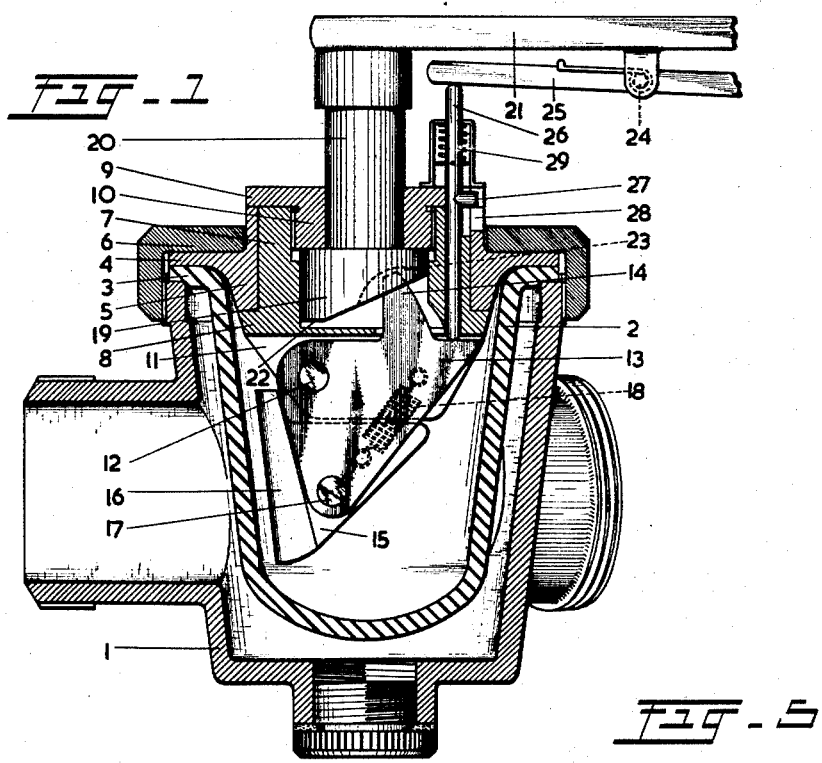
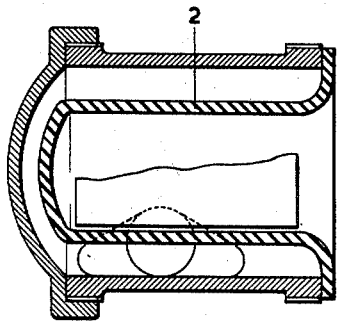
INVENTORS
CORNELIS KLAREN
BY JOHANNES MINNEMA
ATTY

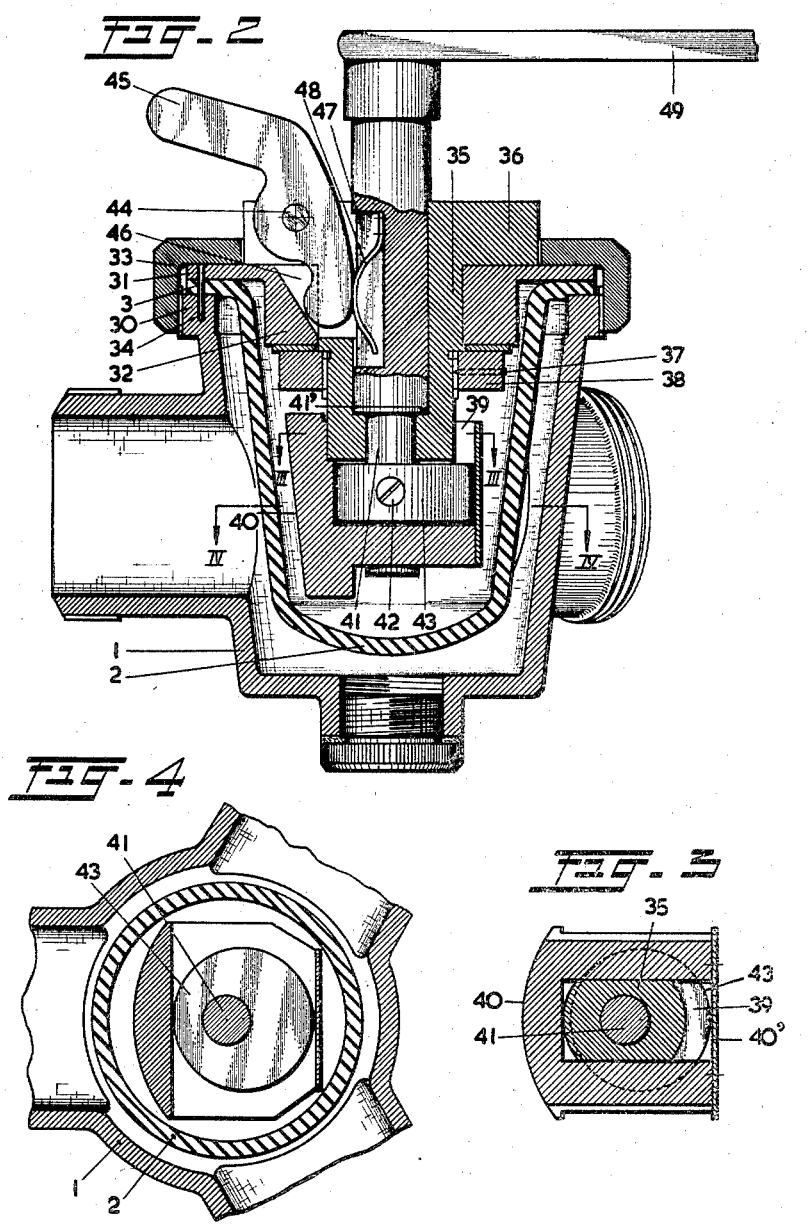

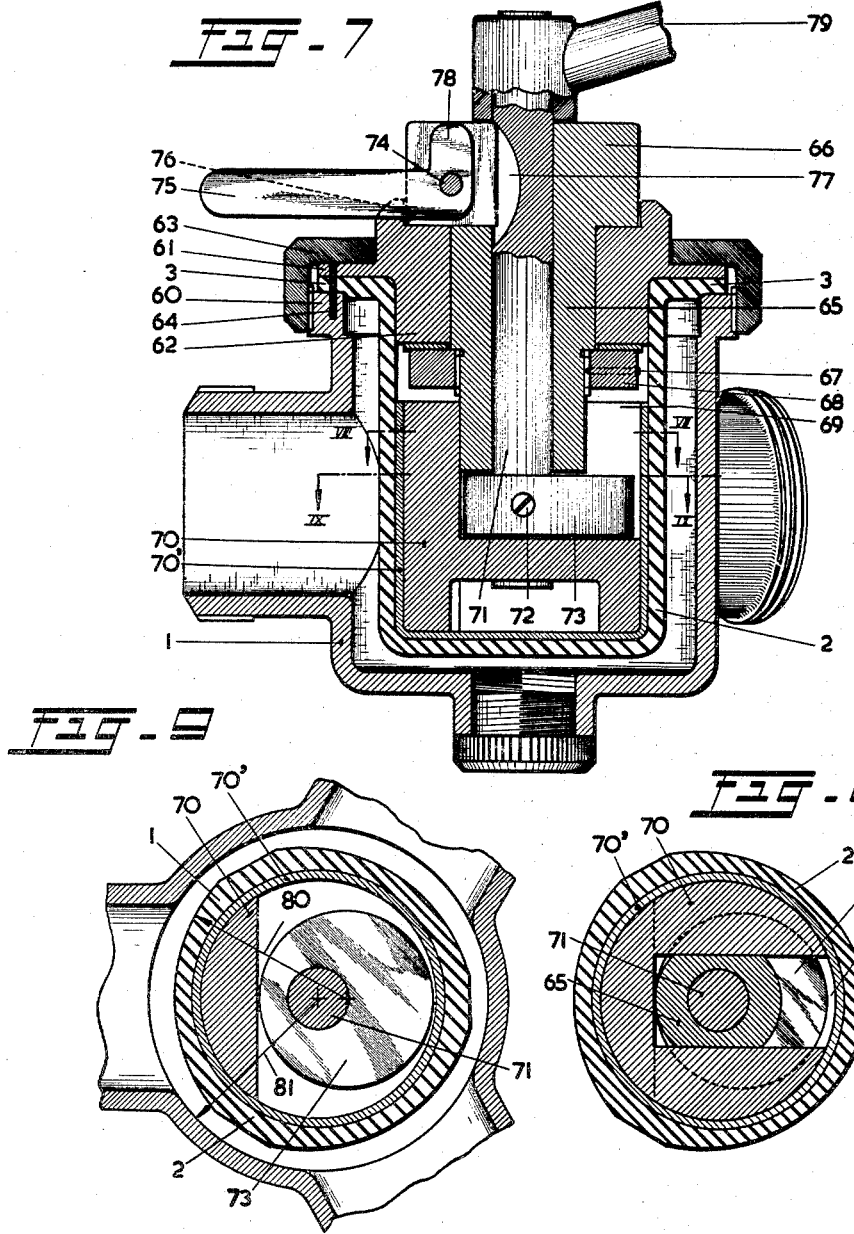

United States Patent Office 2,888,952
Patented June 2, 1959

2,888,952

SELECTOR VALVE

Cornelis Klaren, Murmerwoude, and Johannes Minnema, Westergeest, Netherlands

Application June 7, 1954, Serial No. 434,857

Claims priority, application Netherlands June 5, 1953

5 Claims. (Cl. 137—625.11)

The present invention relates to a selector valve comprising a closure member made from rubber or another flexible material, in the form of a bag which has its free edge sealed to the valve casing. A one-way valve of this type is known in which the bag is adapted to be pressed against the wall of the conduit containing the valve by means of a presser element which is located in said bag and which is secured to an operable screw spindle. Valves constructed in this manner offer the great advantage that the actuating mechanism does not come into contact with the fluid so that there is no possibility for constituents of the fluid to deposit in inaccessible places and thus to cause infections e.g. in milk carrying lines.

This known valve, however, can only be used in a single line, as a shut off valve only.

Now the object of the present invention is to provide a simpler and a more reliable construction of this type of valve, which is also suitable for use as a selector valve. According to the invention this object is achieved in that at least one presser element is mounted for rotation in said bag to enable the wall of said bag to be brought at will into sealing engagement with the edge of the opening of at least one of the connecting branches of the valve casing.

A construction in which the presser element is only operable in pre-selected rotational positions is to be preferred. These measures result in a valve of the type in question, which, notwithstanding its simplicity, is suitable for closing various supply or discharge openings while the measure mentioned in connection with the preferred construction ensures that the closing is always effected in a correct position.

The selector valve according to the invention is more particularly suited for use as a two way valve, in which there is nearly always a through-connection between two lines, while the third line is closed. Nevertheless the valve according to the invention may also be used for simultaneously closing more than one connecting branch, albeit that the branches to be closed must then always be in one and the same position relative to each other, their openings, for example, must be located opposite or beside each other.

However, owing to the principle of the rotatability of the presser element there is always the possibility of closing at will one opening out of a number of openings that is larger than the number of presser elements, which always results in a simplified construction.

A particular effect of the valve according to the invention resides in that the deformation of the bag resulting from said bag being eccentrically pressed against at least one of the openings, enlarges the fluid passage between the other openings.

A favourable embodiment of the valve according to the invention is obtained if the actuating mechanism extending into the bag is mounted for rotation in the valve casing and has the presser element movably mounted at its end; said presser element should then preferably be movable in a direction substantially normal to the axis of rotation of the actuating mechanism. In order to ensure a correct sealing the presser element is guided during its stroke by a portion of the actuating mechanism, which portion also determines the rotational positions of said presser element and which is adapted to be blocked in preselected rotational positions.

According to the invention the operative stroke of the presser element is brought about by the relative rotation of an actuating shaft centrally arranged in the actuating mechanism, which shaft is provided with at least one cam. Said central shaft is only released for rotation relative to said actuating mechanism by a blocking device in those positions in which said blocking device secures from rotation that portion of the actuating mechanism, which determines the rotational position of the presser element.

In another favourable embodiment according to the invention the presser element is connected with the portion of the actuating mechanism determining the rotational position of the presser element, by means of an intermediate piece pivoted to said portion, to which piece said presser element itself is likewise pivoted, the two pivots being substantially parallel and the presser element in addition being adapted to slide on said portion of the actuating mechanism. Thus the presser element will perform its operative stroke without any angular displacement, which is essential for obtaining a correct closure.

In this embodiment it is of advantage for the pivotal intermediate piece to comprise a projection fitting into a recess provided in a flat portion which is inclined relative to the axis of rotation of and connected with the central actuating shaft, which portion is adapted to actuate the presser element via said intermediate piece and its projection upon relative rotation of said central actuating shaft. In this embodiment the selective blocking effect is obtained because the projection of the intermediate piece can only be removed from the recess in the said inclined flat portion by the displacement of a member which, except in predetermined rotational positions of the portion of the actuating mechanism determining the rotational position of the presser element, is secured from such displacement.

When the valve according to the invention is used as a one way valve in a single line this may be so effected that there is no opportunity for the liquid to remain trapped in the line or valve, which is of a great importance in the case of milk carrying lines. According to the invention this can be achieved by connecting the two substantially aligned connecting branches tangentially to the valve casing.

In order to enable the valve of the invention to withstand higher pressures the shape of the presser element of the invention is adapted to the shape of the inner wall of the bag for the purpose of substantially completely supporting said inner wall. Thus the danger of the wall of the bag being pressed between the elements of the actuating mechanism, which would result in said mechanism becoming immovable, is avoided. Opposite the connecting branches the outer wall of the bag should then have a curvature corresponding to the curvature of the inner wall of the valve casing.

The invention will now be illustrated with reference to the accompanying drawings showing some embodiments.

In said drawings:

Figure 1 shows a section of an embodiment of a two-way valve comprising a pivotal intermediate piece to which the presser element is secured.

Figure 2 shows a section of another embodiment of a two-way valve in which the presser element is actuated by a cam.

Figures 3 and 4 show some details of said embodiment in sections on the lines III—III and IV—IV respectively in Figure 2.

Figure 5 shows an application of the valve as a one way valve in a non-branched line.

Figure 6 shows a few parts of said embodiment in their relative positions.

Figure 7 shows a section of still another embodiment of two-way valve while

Figures 8 and 9 show some details of said valve in sections taken on the lines VIII—VIII and IX—IX respectively in Figure 7.

The two-way valve according to Figure 1 comprises a rubber bag 2 which has its flange 3, together with a flange 4 of a ring 5 of T-shaped cross-section, clamped between the upper edge of the valve casing 1 and a nut 6. In the ring 5 a cap-shaped part 7 is so fitted as to be rotatable therein, the edge 8 of said part 7 and the edge 9 of a threaded part 10 screwed into the part 7 enclosing the ring 5 between them, so that the position of said parts relative to each other and relative to the valve casing is determined in axial direction.

The lower face of the cap-shaped part 7 carries two parallel ridges 11 between which the intermediate piece 13 provided with a projection 14 is pivoted on the shaft 12. The intermediate piece 13 likewise fits between two ridges 15 of the presser element 16, with which ridges the intermediate piece 13 is pivotally connected by means of the pivot 17. Two tension springs 18 located on either side of the pairs of ridges 11 and 15 draw the presser element towards the cap-shaped part 7, the ridges 15 being in engagement with and being adapted to slide on the ridges 11, the further connection being formed via the intermediate piece 13 and the pivots 12 and 17.

The intermediate piece 13, therefore, is adapted to pivot on the pivot 12, so that the pivot 17 of the presser element will perform a swinging movement in the direction of the opening to be closed; the edges of the pairs of ridges 11 and 15 which are kept into contact with each other, are so shaped now that during the swinging movement of its pivot 17 the presser element 16 remains parallel to its original position.

In order to cause the presser element to sealingly press the bag against an opening the intermediate piece 13 must be swung about the pivot 12. To that end the projection 14 reaches through the lower face of the cap-shaped part 7 so as to admit of being pressed down by the inclined lower side of the central part 19, 20 fitting in the part 7 and in the screw 10, when said central part is rotated through 180° by means of the actuating lever 21, in which case the projection 14 will finally come to rest below the straight face 22 of the central part 19. In order to enable the central part 19 to be rotated relatively to the projection 14, said projection must first be removed from a recess 23 (shown in dotted lines) in said central part. For said purpose the actuating lever 21 is provided with a lever 25 adapted to pivot about a pivot 24, by means of which lever 25 and through the intermediary of a pin 26 the intermediate piece 13 may be so pivoted in downward direction about the pivot 12 that the projection 14 is released.

Said pin 26 is provided with a cross pin 27 which prevents the pin 26 from being pressed down unless said cross pin 27 is located opposite a recess 28 in the upper edge of the ring 5. As soon as said cross pin sinks into said recess the cap shaped part 7 and together therewith the other parts of the actuating and presser mechanisms are secured from further rotation. When the pin 26 has been pressed downwardly far enough the projection 14 disengages the recess 23, whereupon the central part 19, 20 together with the levers 21, 25 may be further rotated relatively to the other parts.

The recesses 28 are located directly opposite the openings to be closed, so that the actuation of the presser element can only be effected if the mechanism is in its correct position. The lever 25 is rotated away from above the pin 26 during the actuation of the presser elements, but said lever is so broad that prior to the pin 26 being entirely released the projection 14 is already located below the inclined face of the part 19. The spring 29 serves to keep the pin 26 into contact with the intermediate piece 13; the force of said spring is less than the force of the tension springs 18. The projection 14 may be provided with an adjusting screw (not shown) by means of which the front face of said projection may be adjusted to thus control the pressure exerted by the presser element on the bag.

In the embodiment according to Figure 2 the casing 1, the rubber bag 2 and the flange 3 thereof entirely correspond with the same parts of Figure 1, but the actuating mechanism is different. The flange 3 of the bag is clamped between the flange 30 of the valve casing and the flange 31 of a ring 32, which ring is tightened by the nut 33 which is in engagement with the screw thread provided on the flange 30 of the valve casing. The flange 31 is secured from rotation relative to the valve casing by a pin 34. In the ring 32 a sleeve 35 fits rotatably, which sleeve bears with a flange 36 on the ring 32 and which is provided with a screw-thread adjacent its lower end, on which screw thread a nut 38 secured from movement by a pin 37 is screwed so far that the ring 32 is enclosed in axial direction between said nut 38 and the flange 36 without said ring 32 being clamped. At its lower end the sleeve 35 is provided with two parallel flat sides (Figure 3) with which sides said lower end slidingly fits in a groove 39 provided in the presser element 40, so that the angular position of said presser element relative to the sleeve is determined thereby, while said presser element admits of being displaced at right angles to the axis of said sleeve to such an extent that the wall of the bag 2 is pressed thereby against the edge of an opening of a connecting branch. Said displacement at right angles to the axis of the sleeve 35 is obtained by means of a cam 43 secured by means of a screw 42 to the lower end of the central shaft 41 extending through the sleeve 35. Prior to the insertion of the shaft 41 said cam has been laterally inserted into a recess in the presser element (Figure 4). The cam 43 is in sliding fit engagement with the upper and the lower wall of said recess and, if desired with some play, with the front and the rear wall thereof, which latter wall may be a wall 40' separately secured or welded to the presser element in behalf of the manufacture of said element. The central shaft whose lower end has a reduced diameter bears with its collar 41' on a corresponding collar provided in the sleeve 35. The presser element thus mounted is only capable of performing a reciprocating movement in respect of the sleeve in a fixed direction normal relative to the axis of said sleeve. By rotating said sleeve 35 said direction of movement may be adjusted relative to the opening which is to be closed.

In a recess in the flange 36 of the sleeve 35 a blocking member 45 is provided, which member is rotatable about a pivot 44 and which is adapted to engage in recesses 46 in the ring 32, whereby the sleeve 35 is secured from rotation. The locations of said recesses 46 correspond with the positions in which the presser element can cause the wall of the bag to close an opening. The blocking member 45 can only be removed from said recesses when a recess 47 in the central shaft is opposite such a recess, so that the member 45 may enter such a recess 47 in opposition to a leaf-spring 48, the arrangement being such that the presser element 40 is then in its entirely retracted position.

The blocking member, therefore, thus secures either the central shaft 41 from rotation relative to the sleeve 35 or, in the pre-selected positions, secures the sleeve 35 from rotation relative to the casing 1. Thus an operator is prevented from performing an incorrect manipulation.

The central shaft may be provided with a hand wheel or, as shown, with an operating lever 49.

Figure 5 diagrammatically shows such a valve arranged in a particular manner in a single line. The two line-connecting branches 50 and 51 form tangential parts of the valve casing, the line formed by the connecting branches 50 and 51 being located below the valve casing the axis of which is horizontal. The rubber bag 2 may be caused to close the opening of the connecting branch 50 or 51 respectively when the actuating mechanism (not shown in this figure) has been brought in the relative pre-selected position corresponding to the lines 52 and 53 respectively indicating the directions of movement of the presser element. Upon withdrawal of the presser element there is not a single place where fluid may accumulate or be retained. In its open position the valve can be rinsed; the water, supplied e.g. from the left, will be partly driven upwards around the bag 2 by the edge 54, cleaning the whole space in which the valve is located.

In behalf of the tangential connection of the two connecting branches 50 and 51 to the valve casing said branches are flattened in the direction of the casing; however at least the original cross sectional area of the branches is maintained. This is also shown in the diagrammatic arrangement of the bag and the valve casing in Figure 6.

In the embodiment shown in Figure 7 the reference numeral 1 again designates the valve casing, 2 the rubber bag and 3 the flange of the rubber bag. These parts are identical to those shown in the embodiments according to Figures 1 and 2, except that the main form is cylindrical and not conical. The flange 3 is clamped between the upper edge 60 of the valve casing 1 and the flange 61 of a ring 62 which ring is tightened by the nut 63 which is in engagement with the screw thread provided on the flange 60 of the valve casing. The flange 61 is secured from rotation relative to the valve casing by a pin 64. In the ring 62 a sleeve 65 fits rotatably, which sleeve bears with a flange 66 on the ring 62 and is provided with a screw thread adjacent its lower end, on which screw thread a nut 68 secured from movement by a pin 67 is screwed so far that the ring 62 is enclosed in axial direction between said nut 68 and the flange 66 without said ring 62 being clamped.

At its lower end the sleeve 65 is provided with two parallel flat sides (Figure 8), with which sides said lower end slidingly fits in a groove 69 of the presser element 70, so that said presser element is thereby prevented from rotating relative to the sleeve, but only admits of being displaced by means of a cam that will be described hereinafter at right angles to the axis of said sleeve to such an extent that the wall of the bag 2 is pressed against the edge of an opening of a connecting branch. The presser element 70 is surrounded by the sleeve 70' having a bottom and a smooth closed wall against which the bag 2 fits. As a result the bag 2 is substantially entirely supported, so that at higher pressures the wall of the bag cannot be pressed between the various elements and cannot render these elements inoperative nor can itself be damaged. Between the clamped free portion and the portion of the bag that is supported by the sleeve 70' the wall of the bag comprises a short free portion which renders the relative movability of the bag possible. This non-supported portion is too short to present difficulties as a result of the higher pressures that are normally to be expected. If still higher pressures are to be expected said portion of the wall of the bag can be supported, if necessary, by a ring (not shown in the drawing) which is freely movable between the elements 62 and 70.

The displacement of the presser element 70 at right angles to the axis of the sleeve is obtained by means of a cam 73 secured by means of a screw 72 to the lower end of the central shaft 71 extending through the sleeve 65. Prior to the insertion of the shaft 71 and the displacement of the sleeve 70' said cam has been laterally inserted into a recess in the presser element. The cam 73 is in sliding fit engagement with the upper and the lower wall of said recess and, if desired with some play, with the front and the rear wall thereof, which latter wall is formed by the sleeve 70'.

As a result of the fact that the flattened side of the sleeve 65 fits in the groove 69 and that the cam 73 fits in the recess of the presser element said presser element 70 is only capable of performing a reciprocating movement in respect of the sleeve 65 in a fixed direction normal relative to the axis of said sleeve 65. By rotating said sleeve 65 said direction of movement may be adjusted relative to the opening which is to be closed.

In a recess in the flange 66 of the sleeve 65 a blocking member 75 is provided, which member is rotatable about a pivot 74 and which is adapted to engage one of the recesses 76 in the ring 62, whereby the sleeve 65 is secured from rotation. The locations of said recesses 76 correspond with the positions in which the presser element can cause the wall of the bag to close an opening. The blocking member 75 can only be disengaged from said recesses 76 when a recess 77 in the central shaft 71 is opposite such a recess, so that the lug 78 of the member 75 may enter such a recess 77, the arrangement being such that the presser element 70 then is in its entirely retracted position. Thus, the blocking member, which independently or contingently by the action of a spring can snap into a recess 76, either secures the central shaft 71 from rotation relative to the sleeve 65 or, in pre-selected positions, secures the sleeve 65 from rotation relative to the casing 1. Thus an operator is prevented from performing an incorrect manipulation.

The central shaft may be rotated by means of an actuating mechanism 79 which together with the cam 73 at the same time keeps the shaft 71 in its place in axial direction relative to the sleeve 65.

Internally the wall of the rubber bag 2 has the cylindrical shape of the sleeve 70' fitting in said bag, externally, however, it has a curvature, designated by the arrow 80, which is adapted to the curvature, designated by the arrow 81, of the interior of the wall of the valve casing 1.

We claim:

1. A valve comprising in combination, a casing, inlet and outlet ports located in the side wall of said casing, a presser element rotatably mounted in said casing, an envelope of flexible resilient material, said envelope surrounding the presser element and being endwise fixedly sealed with respect to the casing, said envelope being adapted to be brought into engagement with the wall of the casing by actuation of the presser element, said envelope having the form of a bag, rotatable actuating mechanism extending into said bag carrying and rotatively positioning said presser element for linear translational motion in a pre-selected direction substantially perpendicular to its axis of rotation in pre-selected rotational positions of said actuating means, said actuating mechanism including means adapted to linearly translate said presser element subsequent to rotational positioning thereof.

2. A valve comprising in combination, a casing, inlet and outlet ports located in the side wall of said casing, a presser element rotatably mounted in said casing, an envelope of flexible resilient material, said envelope surrounding the presser element and being endwise fixedly sealed with respect to the casing, said envelope being adapted to be brought into engagement with the wall of the casing by actuation of the presser element, said envelope having the form of a bag, rotatable actuating mechanism extending into said bag and carrying said presser element for linear translational motion in a direction substantially perpendicular to its axis of rotation, said actuating mechanism having a portion determining the rotational position of the presser element and for guiding the presser element when moved in said direction normal to its axis of rotation, said portion of the actuating mechanism being adapted to be locked in pre-selected rotational positions, said actuating mechanism including means adapted to linearly translate said presser element subsequent to rotational positioning thereof.

3. A valve comprising in combination, a casing, inlet and outlet ports located in the side wall of said casing, a presser element rotatably mounted in said casing, an envelope of flexible resilient material surrounding the presser element, said envelope being endwise fixedly sealed with respect to the casing and being adapted to be brought into engagement with the wall of the casing by actuation of the presser element, said envelope having the form of a bag, a selectively positionable rotatable actuating mechanism extending into said bag and carrying said presser element for translational motion in a direction substantially perpendicular to its axis of rotation, means locking said actuating mechanism in the selected position, said actuating mechanism having a relatively rotatable centrally arranged shaft, a cam on said shaft for moving the presser element in said direction relative to its axis of rotation, said actuating mechanism including a portion determining the rotational position of the presser element and guiding said element when moved in said direction.

4. A valve comprising in combination, a casing, inlet and outlet ports located in the side wall of said casing, a presser element rotatably mounted in said casing, an envelope of flexible resilient material, said envelope surrounding the presser element and being endwise fixedly sealed with respect to the casing, said envelope being adapted to be brought into engagement with the wall of the casing by actuation of the presser element, said envelope having the form of a bag, rotatable actuating mechanism extending into said bag and carrying said presser element for translational motion in a direction substantially perpendicular to its axis of rotation, said actuating mechanism having a relatively rotatable centrally arranged shaft, a cam on said shaft for moving the presser element in said direction relative to its axis of rotation, said actuating mechanism having a portion for determining the rotational position of the presser element and for guiding said presser element when moved in said direction, locking means carried by said portion of the actuating mechanism and arranged to lock said portion either to said central shaft or to said casing in pre-selected rotational positions.

5. A valve comprising in combination, a casing, inlet and outlet ports located in the side wall of said casing, a presser element rotatably mounted in said casing, an envelope of flexible resilient material, said envelope surrounding the presser element and being endwise fixedly sealed with respect to the casing, said envelope being adapted to be brought into engagement with the wall of the casing by actuation of the presser element, said envelope having the form of a bag having an open and a closed end and being fixedly sealed at said open end, rotatable actuating mechanism extending into said bag carrying and rotatively positioning said presser element for linear translational motion in a pre-selected direction substantially perpendicular to its axis of rotation, said presser element having a shape conforming to substantially the entire inner wall of said bag for the purpose of substantially completely supporting said inner wall, said actuating mechanism including means adapted to linearly translate said presser element subsequent to rotational positioning thereof.

References Cited in the file of this patent

UNITED STATES PATENTS

| 12,950 | Hollely | May 29, 1855 |
| 2,343,584 | Scheele | Mar. 7, 1944 |

FOREIGN PATENTS

| 623,696 | Great Britain | of 1949 |
| 143,999 | Sweden | Feb. 9, 1954 |